(12) United States Patent
Bango et al.

(10) Patent No.: US 10,943,455 B2
(45) Date of Patent: Mar. 9, 2021

(54) SYSTEM FOR GEOLOCATION AWARENESS FOR VOICE ACTIVATED DIGITAL ASSISTANTS

(71) Applicants: Joseph J. Bango, New Haven, CT (US); Michael E. Dziekan, Bethany, CT (US)

(72) Inventors: Joseph J. Bango, New Haven, CT (US); Michael E. Dziekan, Bethany, CT (US)

(*) Notice: Subject to any disclaimer, the term of this patent is extended or adjusted under 35 U.S.C. 154(b) by 0 days.

(21) Appl. No.: 16/869,047

(22) Filed: May 7, 2020

(65) Prior Publication Data

US 2020/0265699 A1  Aug. 20, 2020

Related U.S. Application Data

(63) Continuation-in-part of application No. 15/882,133, filed on Jan. 29, 2018, now abandoned, which is a
(Continued)

(51) Int. Cl.
*G08B 19/00* (2006.01)
*H04W 4/021* (2018.01)
(Continued)

(52) U.S. Cl.
CPC .......... *G08B 19/00* (2013.01); *G08B 7/06* (2013.01); *G08B 21/182* (2013.01); *G08B 25/10* (2013.01); *H04W 4/021* (2013.01); *H04W 4/90* (2018.02)

(58) Field of Classification Search
CPC ........ G08B 19/00; G08B 7/06; G08B 21/182; G08B 25/10; H04W 4/90; H04W 4/021
See application file for complete search history.

(56) References Cited

U.S. PATENT DOCUMENTS

2019/0049492 A1* 2/2019 Townsend .......... G01R 19/2513
2019/0235011 A1* 8/2019 Pinney ...................... G01P 5/02

* cited by examiner

*Primary Examiner* — Ted M Wang
(74) *Attorney, Agent, or Firm* — Michael A. Blake

(57) ABSTRACT

A system for geolocation awareness for voice activated digital assistants comprising: a plurality of digital assistants in communication with a network; a cloud computing system in communication with the plurality of digital assistants via the network; a power transmission line monitor in communication with the network, the power transmission line monitor configured to monitor temperature, electric current in the power transmission line, and three-axis shock above a threshold level; a remote server in communication with the power transmission line monitor via the network and in communication with the cloud computing system via the network, the remote server configured to determine if the monitored temperature indicates an emergency event, and configured to determine if the monitored electric current indicates an emergency event, and configured to determine if the monitored three-axis shock indicates an emergency event, the remote server further configured to transmit to the cloud computing system the type and location of an indicated emergency event; and where the cloud computing system is configured to instruct the digital assistants within a predetermined distance from the emergency event to audibly alert about the emergency event for a predetermined time period. A digital assistant comprising a non-transitory computer-readable medium, where the medium includes a set of instructions stored thereon that when accessed by a processor enable the processor to perform a method of geolocation awareness for the digital assistant, the method comprising: configuring the digital assistant to be in communication with a network; configuring the digital assistant to be in communication with a cloud computing system via
(Continued)

the network; configuring the digital assistant to be in communication with a remote server via the cloud computing system; configuring the digital assistant to be in communication with a power transmission line monitor via the remote server; receiving information from the cloud computing system that an emergency event is detected by the power transmission line monitor; issuing an emergency audible alert by the digital assistant if the digital assistant is within a predetermined distance of the emergency event. A power transmission line monitor comprising a non-transitory computer-readable medium, where the medium includes a set of instructions stored thereon that when accessed by a processor enable the processor to perform a method of geolocation awareness for a digital assistant, the method comprising: configuring the power transmission line monitor to be in communication with a network; configuring the power transmission line monitor to be in communication with a remote server via the network; configuring the power transmission line monitor to be in communication with a cloud computing system via the remote server; configuring the power transmission line monitor to be in communication with a digital assistant located in a residence or a business via the cloud computing system; monitoring temperature, electric current in a power transmission line, and three-axis shock above a threshold level, transmitting the temperature, electric current, and three-axis shock information to the remote server.

12 Claims, 14 Drawing Sheets

Related U.S. Application Data continuation-in-part of application No. 14/756,193, filed on Aug. 14, 2015, now Pat. No. 9,970,975.

(60) Provisional application No. 62/070,105, filed on Aug. 14, 2014.

(51) Int. Cl.
| | | |
|---|---|---|
| *H04W 4/90* | (2018.01) | |
| *G08B 7/06* | (2006.01) | |
| *G08B 25/10* | (2006.01) | |
| *G08B 21/18* | (2006.01) | |

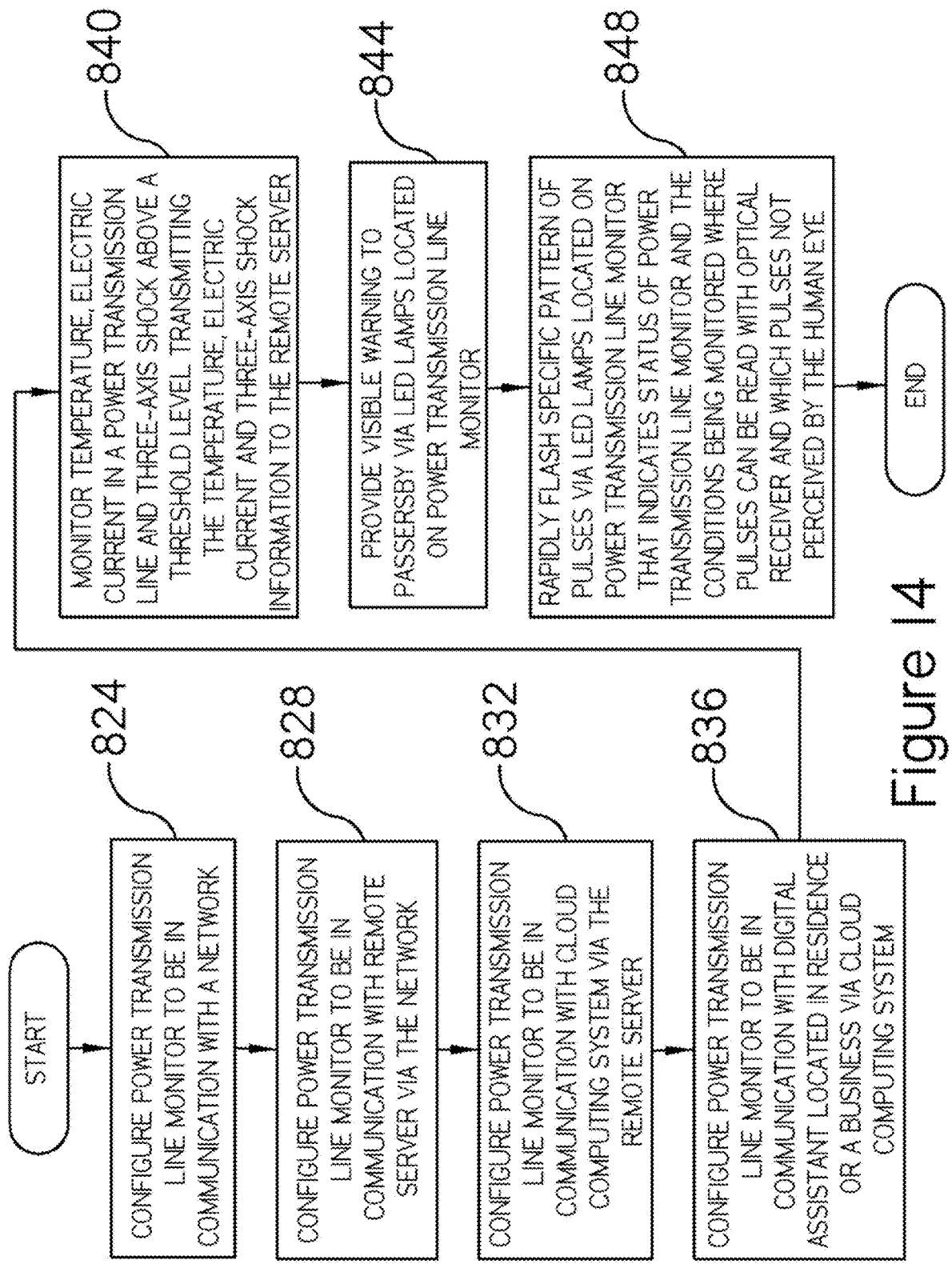

SYSTEM FOR GEOLOCATION AWARENESS FOR VOICE ACTIVATED DIGITAL ASSISTANTS

CROSS-REFERENCES

This patent application is a continuation-in-part of patent application Ser. No. 15/882,133, by Joseph J. Bango and Michael Dziekan, entitled "System for the Standoff Detection of Power Line Hazards and Means for Standoff Data Collection, Storage, and Dissemination", filed on Jan. 29, 2018, the entire contents of which are fully incorporated by reference herein. Patent application Ser. No. 15,882,133 is a continuation-in-part of U.S. Pat. No. 9,970,975, by Joseph J. Bango and Michael Dziekan, entitled "System for the standoff detection of power line hazards", issued on May 15, 2018, the entire contents of which are fully incorporated by reference herein. U.S. Pat. No. 9,970,975 claims the benefit of provisional patent application No. 62/070,105, by Joseph J. Bango and Michael E. Dziekan, entitled "Standoff detection of power line hazards", filed on Aug. 14, 2014, and which provisional application is fully incorporated by reference herein.

FIELD OF INVENTION

This invention relates to the field of systems for the standoff detection of power line hazards and for systems that send a signal to a responsible repair center to inform the center of the location of the defect in the line. In addition, this invention relates to the collection of visual, audible, radio frequency, and other data for analysis, storage, and dissemination.

BACKGROUND

There is currently a problem of providing a signal to a responsible repair center that will characterize the type of cable or power line that is down to enable a responsible repair center to accurately evaluate the defect and determine what repair service is necessary, if any. Often times there are unnecessary electric utility and first responder intervention in the event of a downed electrical cable that may not present a voltage hazard. Utilities are besieged by calls of downed wires, which may in fact be only telephone, cable TV, or other non-hazardous electrical or even fiber optic lines. Nevertheless, power utilities must consider all downed lines as live electrical carriers. Responding as such taxes a utilities ability to effect rapid overall system damage assessment and prolongs system restoration. There is currently no widespread downed line status indicator that will help the public near the defect to avoid danger and assist the responsible repair center in analyzing the defect so as to increase the ability of the responsible repair center to repair lines damaged due to an unplanned natural calamity or other incident. There is no known system in widespread use that provides a warning as to a whether a power line is live, whether this represents high voltage before a distribution transformer or line voltage from a distribution transformer. There is no known system in widespread use that provides a signal or signals that indicate if a power line is experiencing a load due to arcing or a coronal discharge.

Thus there is a need for a system for geolocation awareness for voice activated digital assistants that overcomes the above listed and other disadvantages.

SUMMARY OF INVENTION

The disclosed invention relates to a system for geolocation awareness for voice activated digital assistants comprising: a plurality of digital assistants in communication with a network; a cloud computing system in communication with the plurality of digital assistants via the network; a power transmission line monitor in communication with the network, the power transmission line monitor configured to monitor temperature, electric current in the power transmission line, and three-axis shock above a threshold level; a remote server in communication with the power transmission line monitor via the network and in communication with the cloud computing system via the network, the remote server configured to determine if the monitored temperature indicates an emergency event, and configured to determine if the monitored electric current indicates an emergency event, and configured to determine if the monitored three-axis shock indicates an emergency event, the remote server further configured to transmit to the cloud computing system the type and location of an indicated emergency event; and where the cloud computing system is configured to instruct the digital assistants within a predetermined distance from the emergency event to audibly alert about the emergency event for a predetermined time period.

The invention also relates to a digital assistant comprising a non-transitory computer-readable medium, where the medium includes a set of instructions stored thereon that when accessed by a processor enable the processor to perform a method of geolocation awareness for the digital assistant, the method comprising: configuring the digital assistant to be in communication with a network; configuring the digital assistant to be in communication with a cloud computing system via the network; configuring the digital assistant to be in communication with a remote server via the cloud computing system; configuring the digital assistant to be in communication with a power transmission line monitor via the remote server; receiving information from the cloud computing system that an emergency event is detected by the power transmission line monitor; issuing an emergency audible alert by the digital assistant if the digital assistant is within a predetermined distance of the emergency event.

In addition, the invention relates to a power transmission line monitor comprising a non-transitory computer-readable medium, where the medium includes a set of instructions stored thereon that when accessed by a processor enable the processor to perform a method of geolocation awareness for a digital assistant, the method comprising: configuring the power transmission line monitor to be in communication with a network; configuring the power transmission line monitor to be in communication with a remote server via the network; configuring the power transmission line monitor to be in communication with a cloud computing system via the remote server; configuring the power transmission line monitor to be in communication with a digital assistant located in a residence or a business via the cloud computing system; monitoring temperature, electric current in a power transmission line, and three-axis shock above a threshold level, transmitting the temperature, electric current, and three-axis shock information to the remote server.

BRIEF DESCRIPTION OF THE DRAWINGS

FIG. 14 is a flowchart showing one embodiment of the method performed by the power transmission line monitor.

DETAILED DESCRIPTION OF INVENTION

Figure 1:
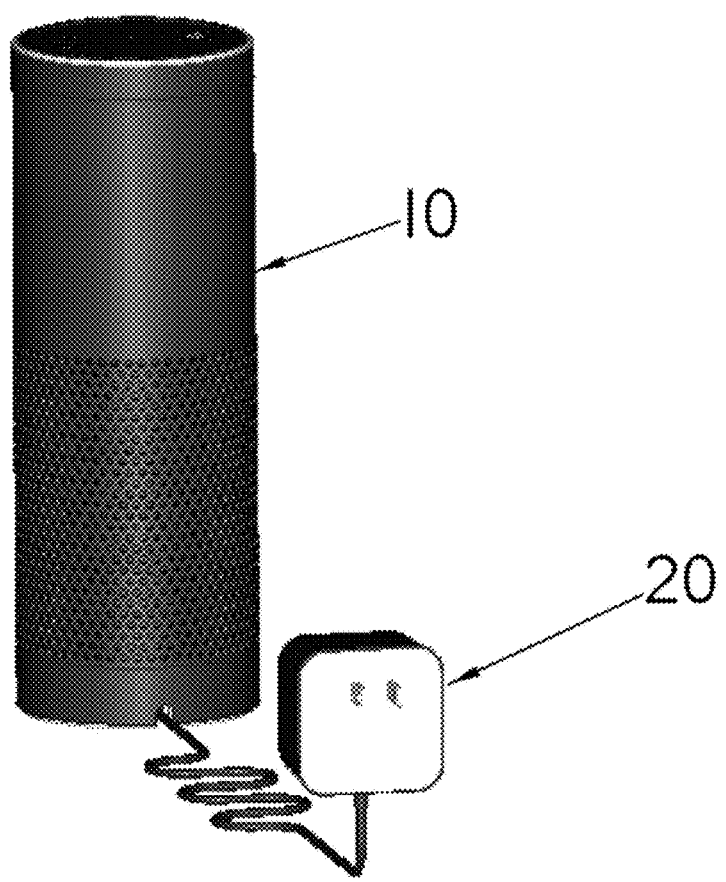
FIG. 1 is a perspective view of a digital assistant.

It has been a dream of computer scientists since the time of Alan Turing to create a natural speech interface with a computer, so a user can only speak a question or command instead of physically typing in that information.

There are several commercially available Wi-Fi connected, voice activated digital assistants on the market, such as Amazons Alexa, Amazons Dot, Google Home, and Apple's SmartPad. These audio digital assistants can receive local weather information determined by a person's general location, and not necessarily a person's specific location. For example, a user asks Alexa what the outside temperature is, and a response is given from Alexa. The temperature information is generally reported by a local airport or a designated climate monitoring station within a certain proximity to the user. The closer the user is to the airport or climate monitoring station, the more accurate the temperature reported by Alexa will be. Unless the user has an outdoor wireless weather station, the specific local weather will not be exact but will be within a range of plus or minus several degrees—since the actual weather data being reported could be up to ten or more miles away. It is easily understood because how many times have we stepped outside of our home where the temperature is hot and humid, while just a few miles down the road at a friend's house, a cooler, less humid climate is encountered.

With the Amazon Alexa, a user can input specific location data into the app on their smartphone so that the Alexa "knows" where the point of reference is. As an example, a user can add their work destination to the app on their smartphone. The smartphone communicates information to the Alexa and when the user asks how traffic is, the Alexa knows that the question pertains to the traffic between the home location and the persons work destination. If there are any accidents reported between the home reference location and the destination work location, the Alexa will indicate to the user that extra time should be given to the drive, or an alternate route be used so they could arrive at work on time. In addition to potential accidents or road construction, reports could be given to the user pertaining to weather data, such as flooding, downed trees, or snow and ice conditions. The described invention teaches how to add additional sensor data to a digital assistant, such as but not limited to an Alexa type device, so that a user can be more accurately informed about ambient conditions, such as weather information including any possible wild fires that could impact a user's home, work, or drive to work. Alexa may only work when there is functioning Wi-Fi so that Alexa can communicate through the AVS (Alexa Voice Services). AVS is a cloud-based service that provides APIs to interface with the Alexa smart assistant. The AVS enables the Alexa unit to access cloud based Alexa capabilities. For example, when a user asks the question—"Alexa, what is the weather?" the question is sent via Wi-Fi from the Alexa unit to AVS. The Alexa unit itself has only minimal capabilities, and is generally not much more than a Wi-Fi microphone connected to AVS. It is the AVS that does the bulk of the work in recognizing what was said, and determining what to do with that information as well as actually performing tasks based on that information. After the AVS determines that weather information is wanted, the Alexa unit will report where the user's home location is and determine what climate reporting station is located in close proximity to that location. Without a viable Wi-Fi connection, the Alexa unit is nothing more than a glowing paperweight. One of the great ideas incorporated into the AVS is that Amazon, like other major companies, allowed skills to be incorporated into the unit. Amazon allows approved developers free access to AVS so that new Alexa skills can be created— thereby augmenting the Alexa unit. It is important to realize that although the Amazon Alexa is one embodiment, a person of ordinary skill in the art will recognize other home assistants such as, but not limited to, Amazon Dot, Google Home, and Apple HomePad are similarly functioning cloud based devices with their own versions of AVS.

It is understood that the voice activated digital assistants are capable of communicating their home location with cloud based servers. By having a physical, geographical location as a reference point, any remote sensors that can communicate with the appropriate cloud based communication protocol can transmit location aware information to voice activated digital assistants within a specified radius of the voice activated digital assistant. As an example, a remote sensor is located on a power line in Santa Clara, Calif., and a fire is detected. However, broadcasting a fire warning to every voice activated digital assistant would be a major annoyance to over ninety-nine percent of all voice activated digital assistants, and only of importance to those located within a short distance of the actual fire near Santa Clara, in this example. People living in Alaska or Hawaii will not be affected by a fire in Santa Clara, Calif., so a geographical region must be identified.

Since the voice activated digital assistants transmit location information to their cloud based servers, the servers can be configured to warn only the voice activated digital assistants located within a mile or less of the fire. This may be analogized to a reverse 911 system and alert those in immediate danger. Additionally, instead of an immediate warning alert, a watch alert can be sent to voice activated digital assistants that are further than a about mile away, but not more than about five miles away. Of course, other distances may be used. There could be a region of immediate danger, and a larger region of possible danger. With a watch alert, people at a greater distance have time to prepare for any possible evacuation if the wild fire gets larger.

FIG. 1 is a perspective view of a home assistant 10 and its power supply 20. In one embodiment, the home assistant may be an Amazon Alexa. The Amazon Alexa is one of several commercially available voice activated digital assistants designed to interact with people to help make basic tasks simpler and more convenient, such as the following:

Providing hands-free timers to help with cooking tasks.

Providing hands-free help with Fahrenheit to Celsius temperature conversion and conversion between metric to imperial units.

Providing hands-free creation of grocery, shopping, and To-Do lists.

Alerting the user to calendar events, and kid's school events and field trips.

Allowing hands-free audible weather alerts.

Allowing hands-free control of specially equipped ambient lighting.

Interactive hand-free audible games such as the popular television show Jeopardy as well as basic trivia games.

Providing hands-free audible flash news briefings and traffic alerts tailored to the users commute.

The home assistant 10, as well as the other commercially available voice activated digital assistants, provide a means for the user to interact with the outside world through cloud based, interactive services. By having the Amazon Alexa or other comparable audio digital assistants utilize cloud based real-time weather data, traffic data, and utility data, the user can be alerted to impending wildfires, floods, downed power lines, road closures caused by accidents or unusual weather phenomena, and other potential disrupting events. It should be obvious to those skilled in the art that although audio only devices are discussed, the disclosed invention also applies to visual as well as audio devices. Many large tech companies produce these devices, including, Amazon, and Google.

Figure 2:
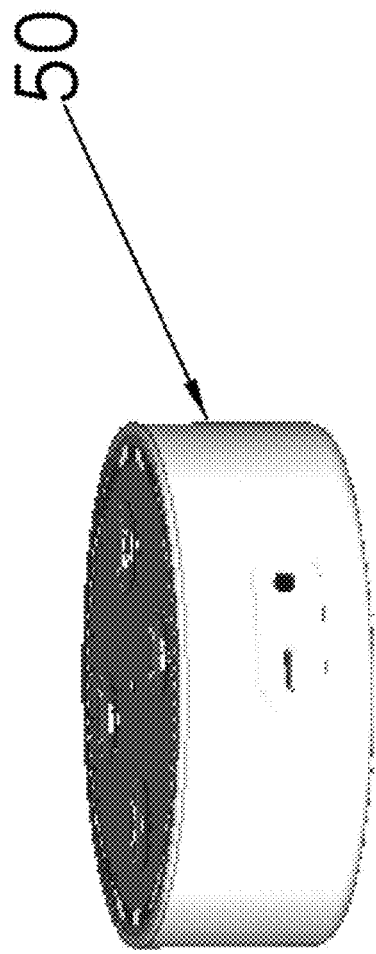
FIG. 2 is a perspective view another digital assistant.

FIG. 2 is a perspective view of another embodiment of a home assistant 50. In one embodiment, this home assistant 50 may be the Amazon Dot 10. The Amazon Dot—functionally similar to the Amazon Alexa, although in a smaller footprint—is one of several commercially available voice activated digital assistants designed to interact with people to help make basic tasks simpler and more convenient, such as the following:

Providing hands-free timers to help with cooking tasks.

Providing hands-free help with Fahrenheit to Celsius temperature conversion and conversion between metric to imperial units.

Providing hands-free creation of grocery, shopping, and To-Do lists.

Alerting the user to calendar events, and kid's school events and field trips.

Allowing hands-free audible weather alerts.

Allowing hands-free control of specially equipped ambient lighting.

Interactive hand-free audible games such as the popular television show Jeopardy as well as basic trivia games.

Providing hands-free audible flash news briefings and traffic alerts tailored to the users commute.

The Amazon Dot, as well as the other commercially available voice activated digital assistants; provide a means for the user to interact with the outside world through cloud based, interactive services. By having the Amazon Dot or other comparable audio digital assistants utilize cloud based real-time weather data, traffic data, and utility data, the user can be alerted to impending wildfires, floods, downed power lines, road closures caused by accidents or unusual weather phenomena, and other potential disrupting events. It should be obvious to those skilled in the art that although audio only devices are discussed, the disclosed invention also applies to visual as well as audio devices. Many large tech companies produce these devices, including, Amazon, and Google.

Figure 3:
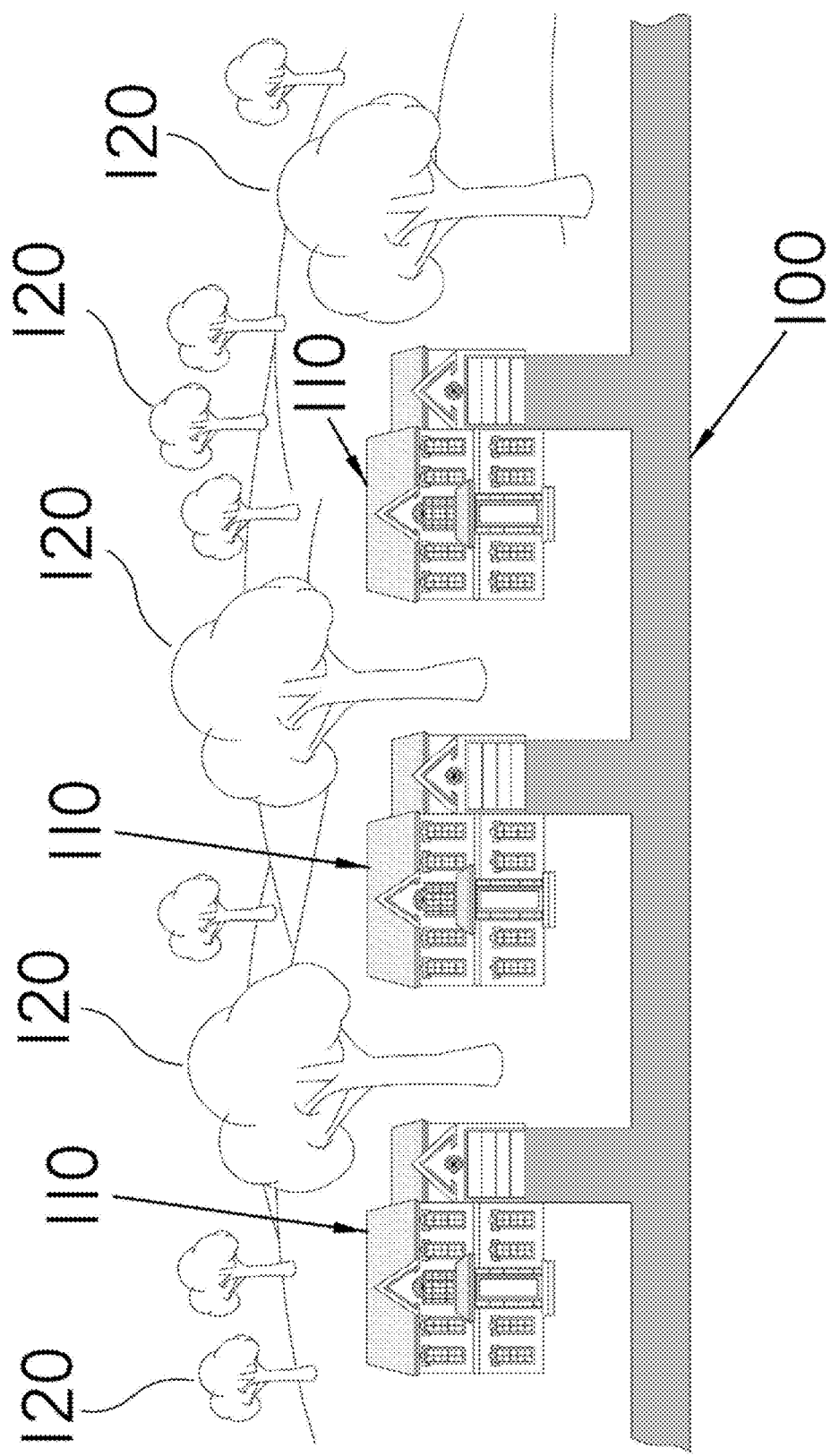
FIG. 3 shows a residential housing development.

FIG. 3 is a schematic drawing of a typical residential housing development, detailing three houses 110 that have driveways and garages. The homes are connected along a common main road 100, and the houses have trees 120 arranged throughout the yards. It is important to note that the homes are all equipped with some type of audio digital assistant such as, but not limited to Amazon Alexa, Amazon Dot, or Google Home.

Figure 4:
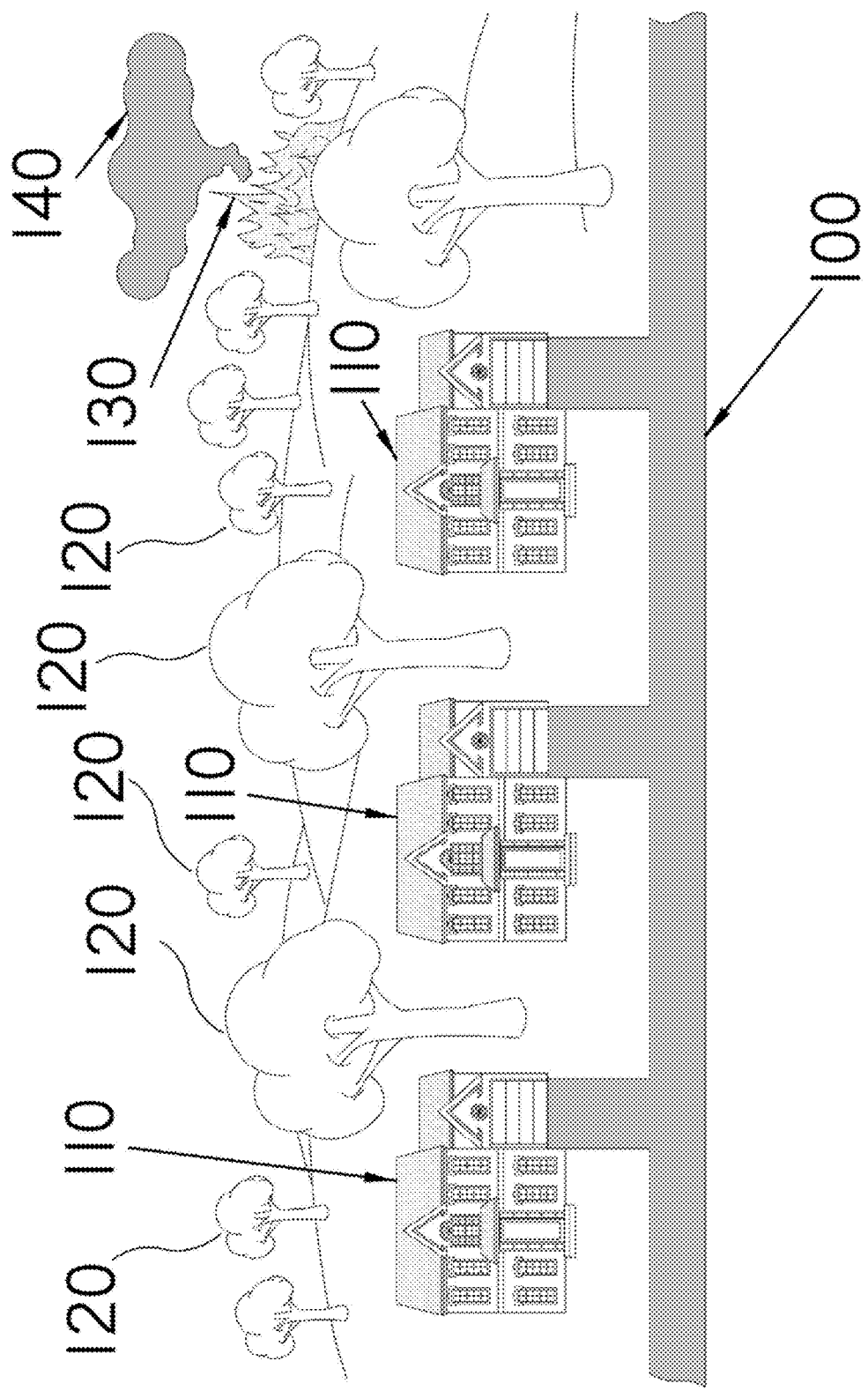
FIG. 4 shows a residential housing development and a wildfire.

FIG. 4 is a schematic drawing similar to FIG. 3, however in this figure, there is a wildfire 130 that is producing large amounts of smoke 140 that may or may not have been noticed by the three homes shown in the figure. With external sensors making real-time ambient measurements, the smoke would be detected, as well as the infrared signature of the fire and an alert would be sent to the commercially available voice activated digital assistants 10, 50.

Figure 5:
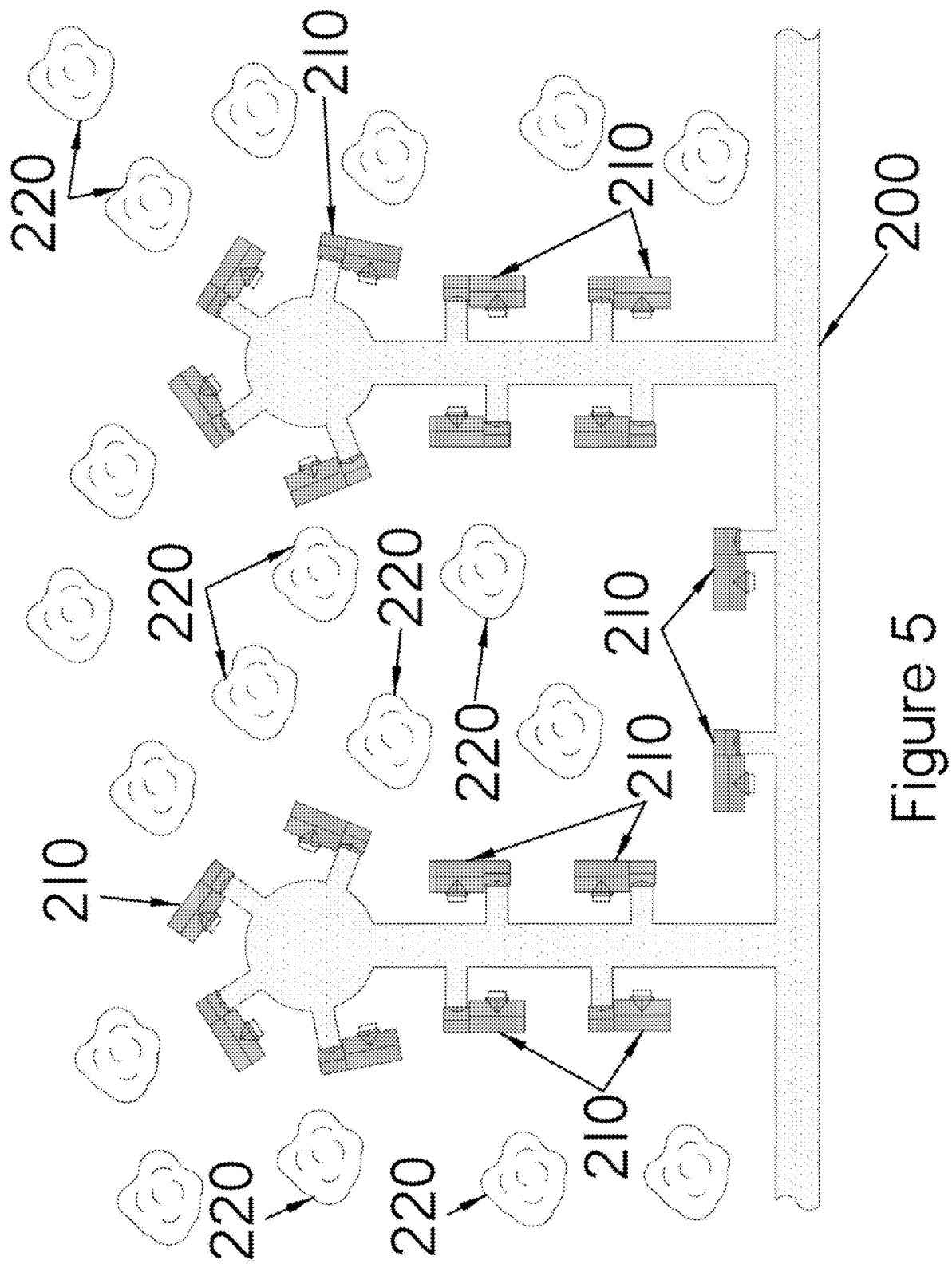
FIG. 5 is a schematic aerial representation of a residential housing development.

FIG. 5 is a schematic aerial view of a typical residential neighborhood, detailing a plurality of houses 210 that have driveways and garages. The houses 210 are located along a common main road 200, and the houses have trees 220 arranged throughout the yards. It is important to note that the homes are all equipped with some type of audio digital assistant such as an Amazon Alexa, Amazon Dot, or Google Home.

Figure 6:
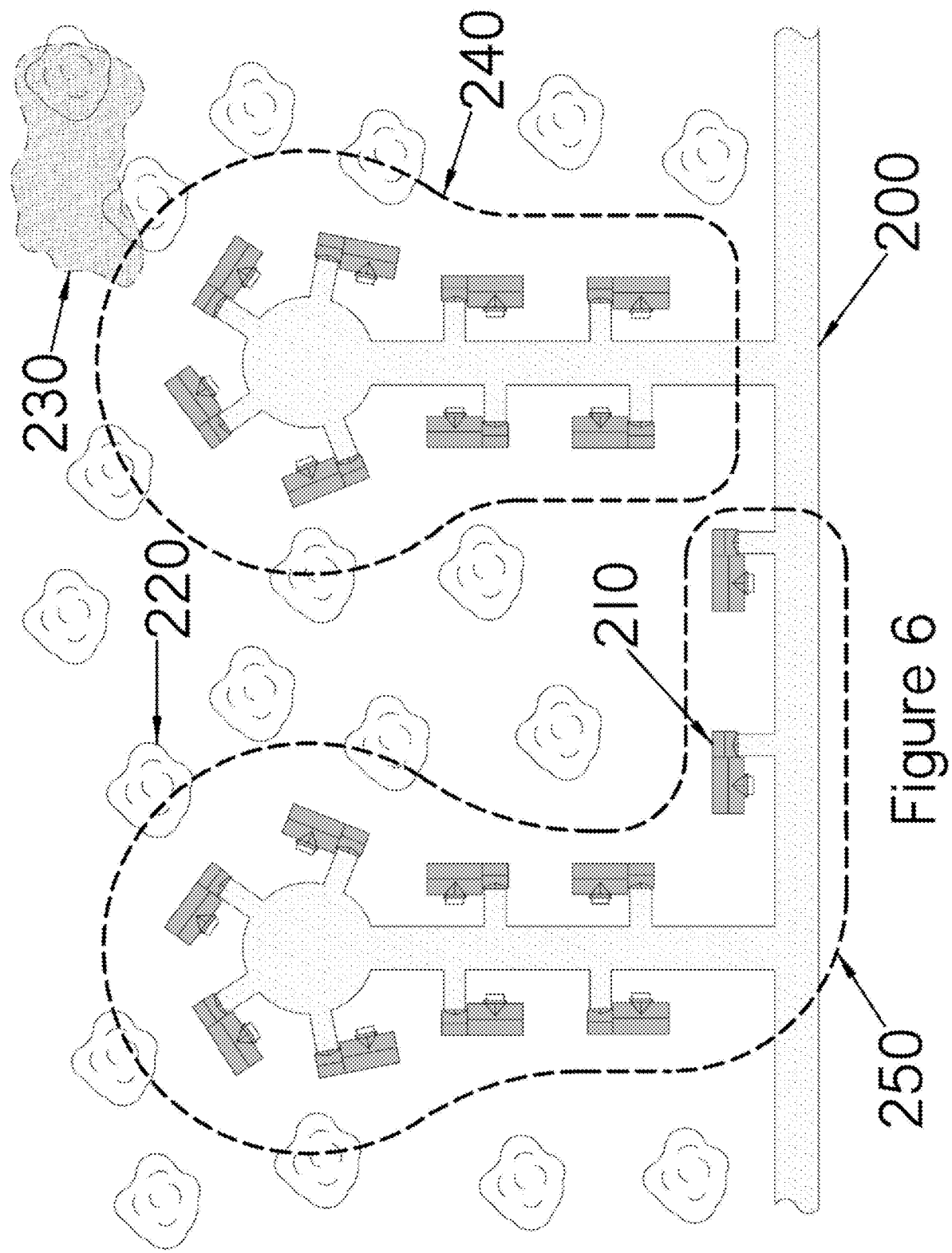
FIG. 6 is a schematic aerial representation of a residential housing development and a wildfire.

FIG. 6 is the schematic aerial view of the neighborhood from FIG. 5. However in this figure, there is a wildfire 230 that may or may not have been noticed by the homes shown in the figure. With external sensors making real-time ambient measurements, the smoke would be detected, as well as the infrared signature of the fire and an alert would be sent to the commercially available voice activated digital assistants. Since the GPS (Global Positioning System) locations of the homes are known to the audio digital assistants, and the real-time sensors monitoring ambient conditions have a known GPS location, an evacuation warning can be sent to the homes that are closest in proximity to the wildfire. The dashed line 240 surrounding the homes on the right are in imminent danger from the close proximity to the wildfire, while a dashed line 250 surrounds the homes on the left are in less danger because they are further from the wildfire.

Figure 7:
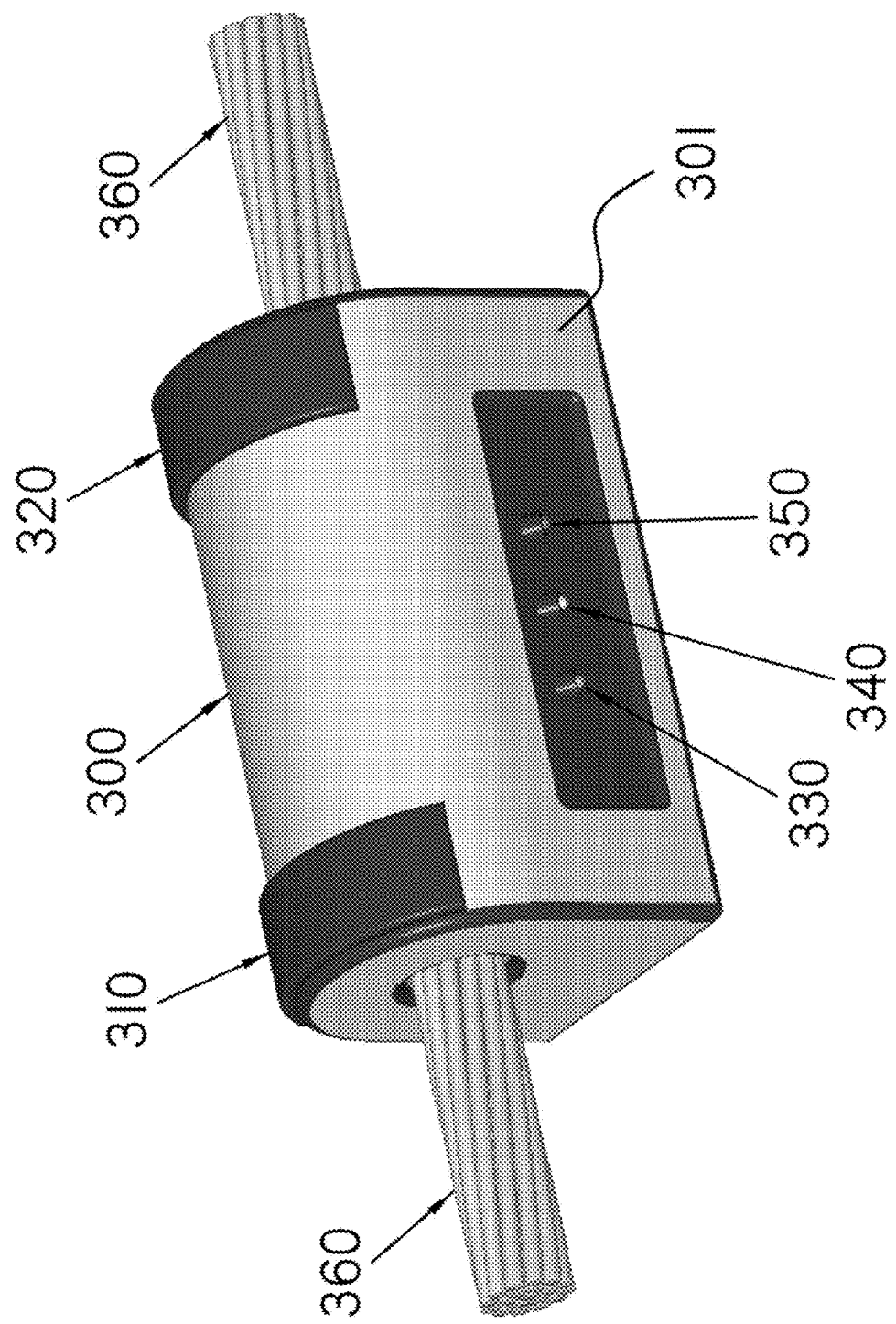
FIG. 7 shows a perspective view of a power transmission line monitor attached to a power transmission line.

FIG. 7 shows a perspective view of a power transmission line monitor 301. The power transmission line monitor 301 comprises a clamshell housing 300 that encircles a power transmission line 360. The clamshell housing 300 may be held closed with retaining strips 310 and 320. The power transmission line monitor 301 may comprise visual status LED lamps 330, 340, 350 located on the outside face of the clamshell housing 300. The LED lamps may be different colors, and in one embodiment may be a green lamp 330, yellow lamp 340, and red lamp 350. Although wavelengths in the visual spectrum are specified, one or more of the LED lamps may be chosen so that their operating wavelength is outside of the normal visual spectrum. The important thing to understand is that the optical receiver may utilize a matching wavelength and/or be configured to detect the optical wavelength outside of the normal visual spectrum.

Figure 8:
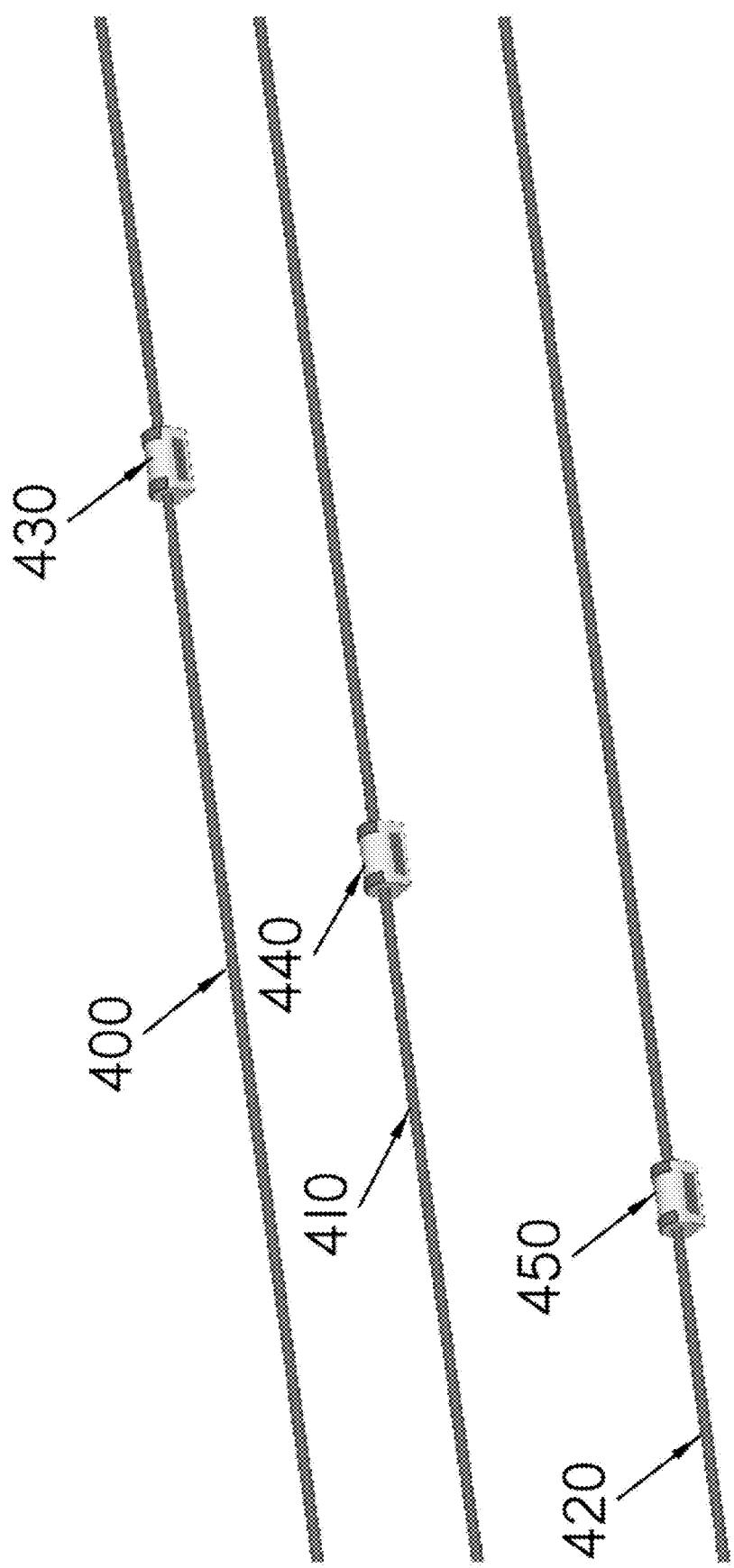
FIG. 8 shows a perspective view of three parallel power transmission line monitors.

FIG. 8 is a perspective view of three parallel power line monitors 430, 440, and 450, each being equipped with ambient real-time sensors. Three phase power transmission lines are represented by 400, 410, and 420 respectively.

Figure 9:
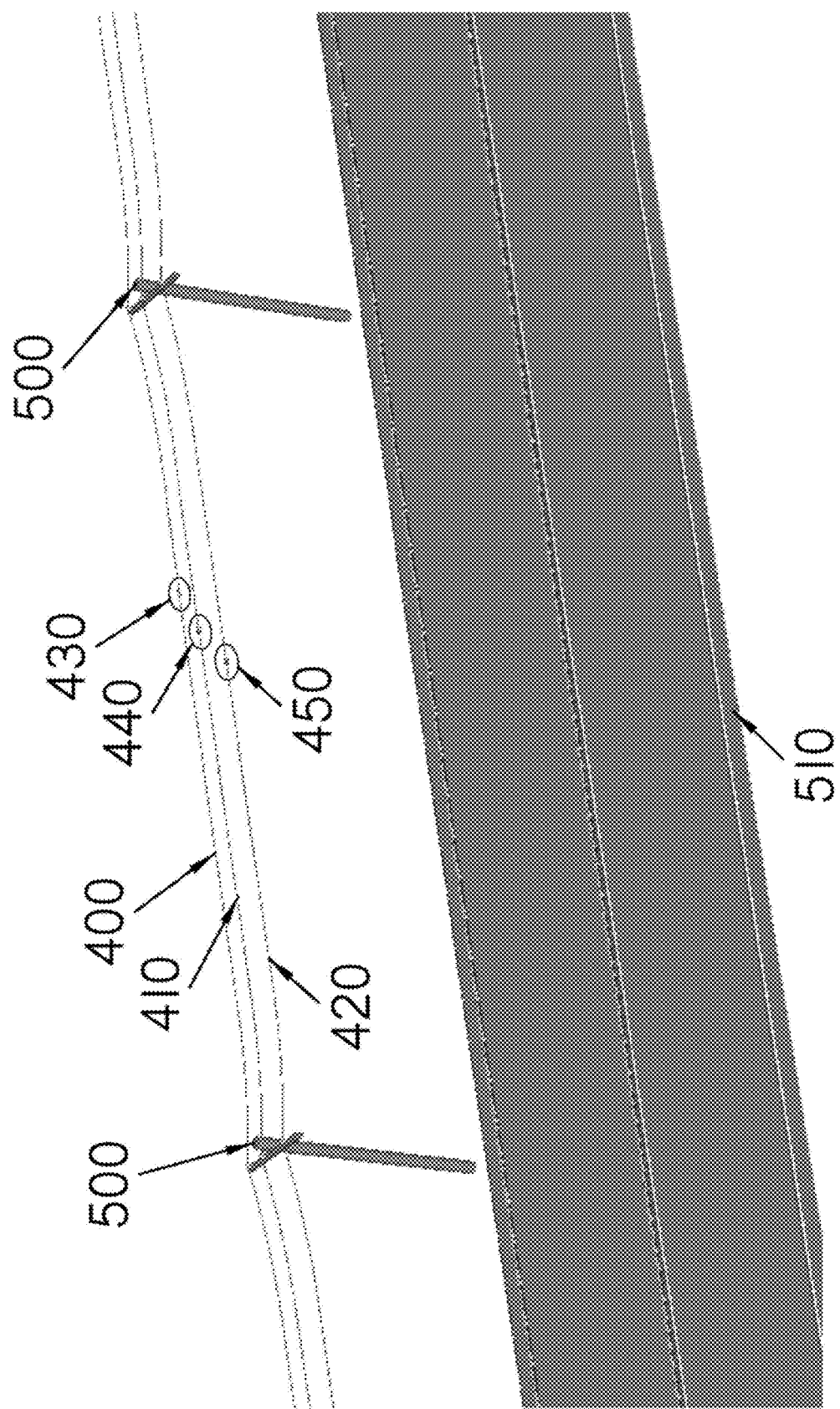
FIG. 9 shows a perspective view of a power transmission line monitors located next to a roadway.

FIG. 9 shows the power line monitors located next to a roadway 510, a typical location for power transmission lines 400, 410, and 420. The transmission lines are supported by poles 500. Power line monitors 430, 440, and 450 are preferably staggered with respect to one another along the transmission line.

Figure 10:
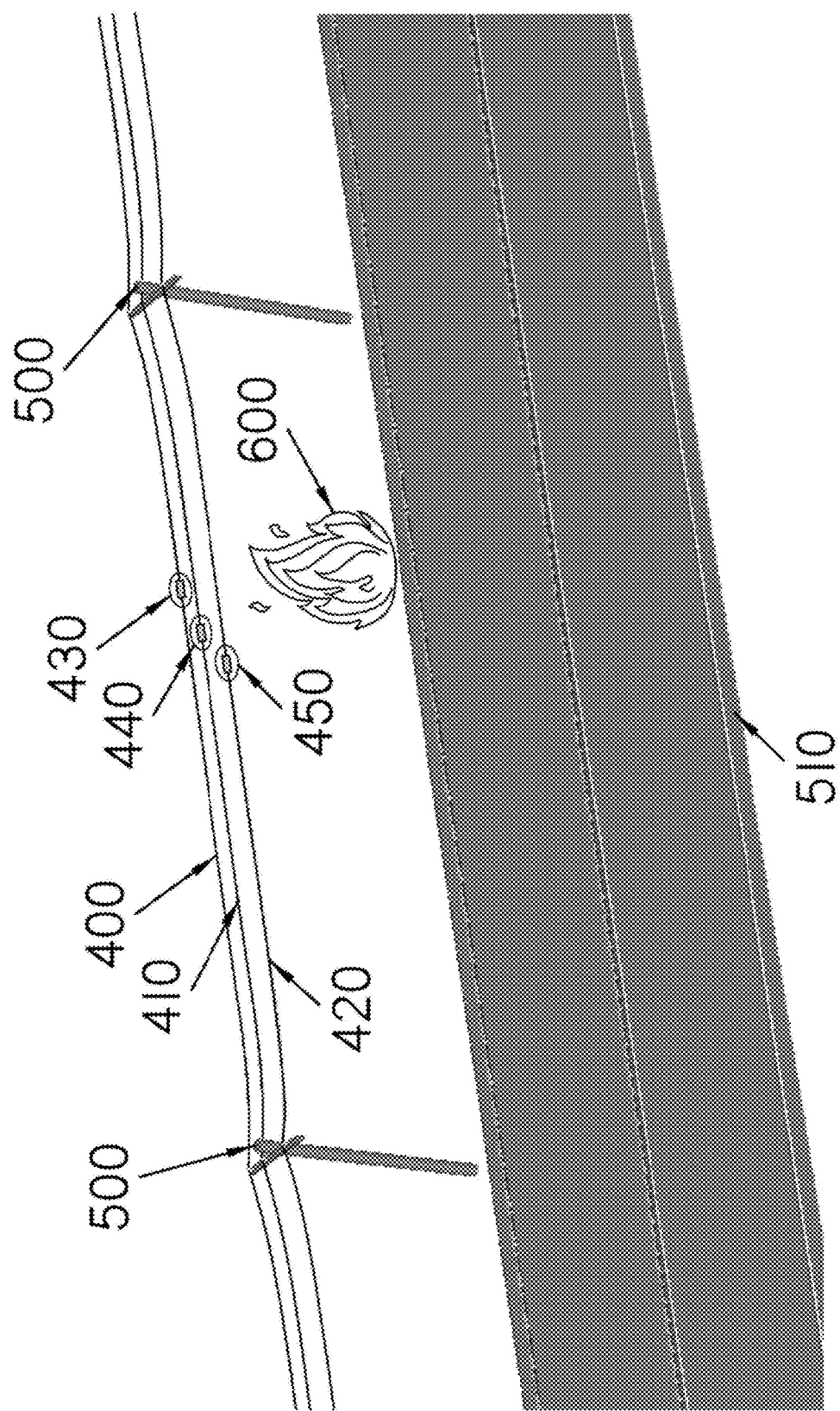
FIG. 10 shows a perspective view of power transmission line monitors located next to a roadway and a fire.

FIG. 10 shows several power line monitors 430, 440 and 450 attached to power transmission lines 400, 410 and 420, the lines located next to a roadway 510. The transmission lines are supported by poles 500. Transmission line monitors 430, 440, and 450 are preferably staggered with respect to one another along the transmission lines 400, 410, 420. In a situation in which there is a brush or ground fire 600 within close proximity to the transmission line monitors 430, 440, and 450, one or more of the transmission line monitors 430, 440, 450 will measure a sudden increase in ambient temperature. This sudden increase will be indicative of a brush or ground fire and the microcontroller, which is part of the an ambient sensor package that is part of the power transmission line monitor, will indicate an alarm condition through use of the communication module which includes multicolored LED visual indicators, an acoustic alarm, such as a piezo buzzer to warn pedestrians of a power line hazard, and is configured to provide RF communication with a network, the power utility, cellular devices such as a smart phone, and simplex or duplex communication with other power line monitors. Due to the unique nature of LED's to switch on and off rapidly, a coded optical message could be sent to a capable optical receiver located within a short distance from the power transmission line monitor. The LED can rapidly flash a specific pattern of pulses that can be read with an appropriate optical receiver that would be able to read the status of the transmission line monitor. The status information could be a repeated series of status codes indicating the conditions that were monitored, such as temperature, electric current, any excessive three-axis shock, and the time and date of the occurrence. Because the LED's can be switched on and off so rapidly, it would be impossible for the human to interpret this information. Forrest M. Mims III has long pioneered the "dual use" of LED's as not only sources of illumination, but also as narrow band light sensors. Mims wrote a paper for Applied Optics magazine in 1992, entitled "Sun Photometer with Light-Emitting Diodes as Spectrally Selective Detectors", and the Mims paper is fully incorporated by reference herein. In this paper, Mims describes how to use LED's in a reciprocal role as a narrow band light sensor. The dual use (light transmission and light reception) is referred to as the "Mims effect". Since the LED cannot do both things at the exact same time, the microcontroller, that is part of the power transmission line monitor, may periodically place the indicating LED in a reversed bias condition. In this way, the individual LED's can serve as a duplex method of serial communication. Each individual transmission line monitor can be interrogated by a remote optical transceiver that can be either a truck mounted unit, a portable, hand held unit, or a small, lightweight unit capable of being carried by a small autonomous drone to provide long range monitoring of the transmission lines. In addition to measuring an ambient temperature increase near the transmission lines due to a fire, there may also exist a situation where the fire is locally heating a transmission line some distance away from the transmission line sensor where the ambient temperature has not changed much, but the transmission line itself may be heating up due to exposure to a fire or heat source. In this case, by transmitting this data to the relevant individuals in charge of transmission line safety, lineman could be sent to investigate the situation before the transmission line has a catastrophic failure. Any transmission line failure can cost thousands, if not hundreds of thousands of dollars in damage to infrastructure. In extreme situations, in which a transmission line failure causes a large wild fire, as has happened in the state of California over recent years, the damage could result in the loss of infrastructure, livestock, homes, and lives, and could potentially run into billions of dollars! By carefully and closely monitoring ambient conditions around transmission lines as well as the conditions of the transmission line itself, diagnostic information can be produced that will allow the relevant individuals in charge of transmission line safety to investigate a potential hazardous situation before the transmission line has a catastrophic failure.

Real-time sensor data sent from the power transmission line monitors would be transmitted from the power line modules communication module to a remote server—owned and operated by the manufacturer or owner of the smart assistant, such as Amazon, Microsoft, or Google, or another suitable entity, so that this information can be relayed based upon GPS location to the affected houses containing home audio/visual digital assistants.

Figure 11:
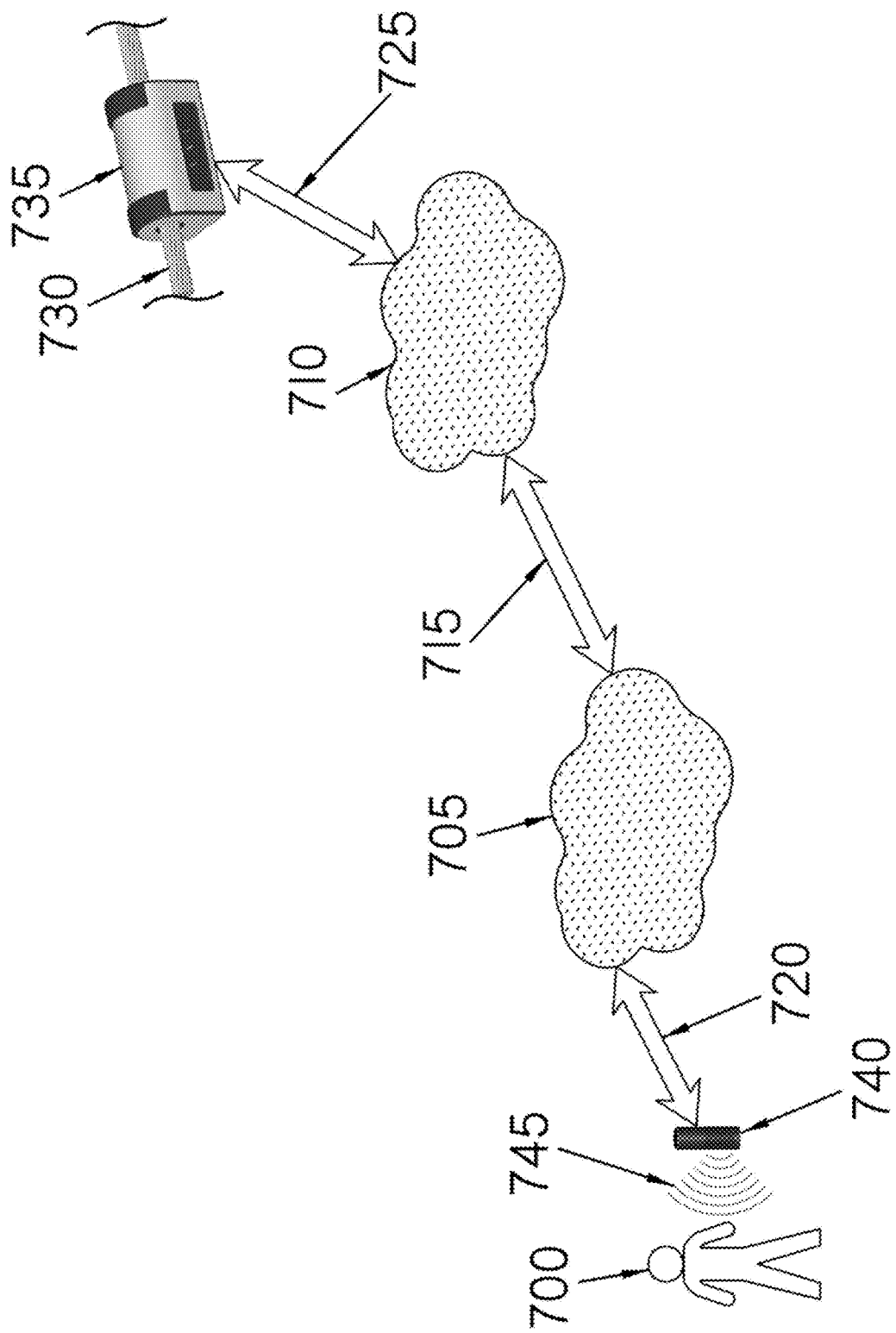
FIG. 11 is a schematic depicting communication between cloud services and a power transmission line monitor and a user.

FIG. 11 shows a user 700 that is within close proximity of a voice activated digital assistant 740. The user 700 is listening to the audio 745 generated by the voice activated digital assistant 740. There is an active Wi-Fi link 720 between the voice activated digital assistant 740 and a cloud computing service 705, such as but not limited to AVS. Without the active Wi-Fi link 720, the voice activated digital assistant 740 may not respond to any user generated commands or query's. An internet based link 715 exists between the cloud computing service 705 and a cloud computing service for the power line monitor 710. The power line cloud computing service 710 may process geographic location data that will indicate where on Earth the specific location of each power line monitor is. The power line monitor 735 is attached to a power line 730 and will monitor a series of power line conditions, including power line vibration, power line g-shock, power line voltage, ambient temperature, and power line temperature, to name a few. For more detailed description of what is monitored, see U.S. Pat. No. 9,970,975. Power line status information may be transmitted from the power line monitor 735 to the power line cloud computing service 710 through a communication link 725.

When a group of homes are located within close proximity to an abnormal situation such as a wild fire located in close proximity to a power line monitor, the geographic location of the power line monitors that are recorded in the power line cloud services 710 will be in continual communication with any voice activated digital assistants in a danger zone. When the geographical location of any voice activated digital assistants are determined to be within close proximity (for example, within one mile) of the geographical location of the power line sensor reporting the wild fire, an immediate warning alert would be sent to those voice activated digital assistants to let the occupants know that they are in immediate danger. Any voice activated digital assistants that are located at a further distance than one mile, but not more than three miles for example, would be issued a watch alert—indicating that they might be in danger if the wild fire spreads. This would give people that are further away a "heads up" notice so they can prepare for any possible evacuation. If people were warned about a fire that live a much greater distance away, for example ten miles, then an unnecessarily high volume of traffic could be created when they are not in any immediate danger. This high volume of traffic could impede first responders that are dispatched to combat the wild fire. Since the voice activated digital assistant does not have the computational ability to make the decision about who is in immediate danger and who is not, the AVS cloud computing service has the necessary computational ability to make accurate decisions.

It is important to note that although the Amazon AVS cloud computing services that are used in conjunction with Amazons Alexa and Dot voice activated digital assistants, the invention may work with any other digital assistant, such as those digital assistants sold by Google, Apple, and Microsoft or other manufacturers or entities. Further, smart devices, such as tablet, cell phones, etc., may become digital assistants in the future simply by downloading an app, or changing the settings on the smart device. Many organizations have their own cloud based computing service that communicates with their (or other) voice activated digital assistants. Amazon's protocol was shown as an example, but it could just have easily been Google, Apple, or Microsoft, or any other entity to sells digital assistants or makes apps that can turn a smart device into a digital assistant, or entities that sell smart devices that have the option to become digital assistants.

Figure 12:
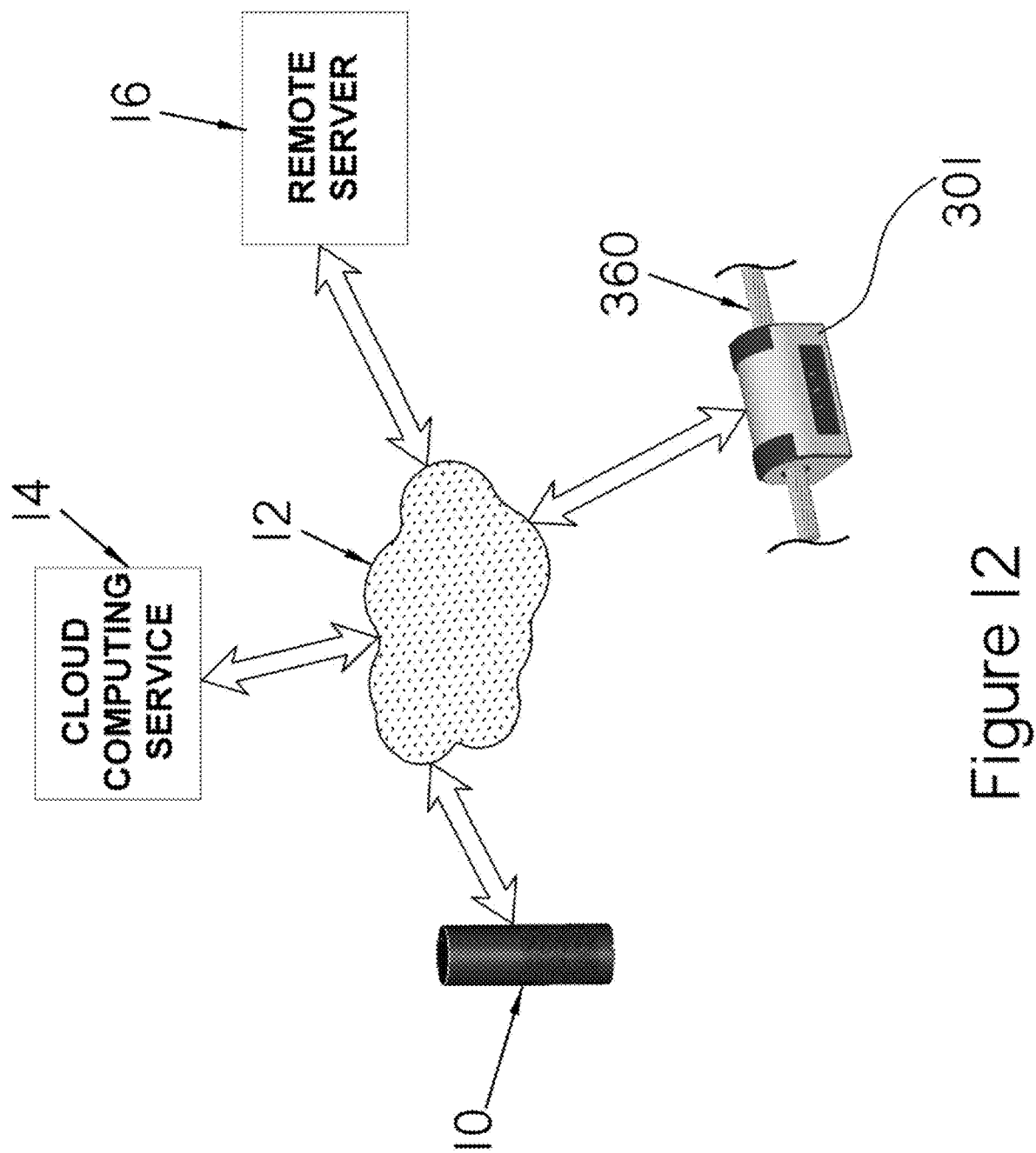
FIG. 12 is a schematic showing another embodiment of the invention.

FIG. 12 is a schematic of another embodiment of the system. A digital assistant 10 is in communication with a network 12. The network 12 may be the internet, or an intranet, or any other suitable network. The digital assistant 10 is in communication with a cloud computing service 14 via the network 12. The cloud computing service 14 may be a service like the Alexa Voice Services, or any other suitable service. A power transmission line monitor 301 is attached to a power transmission line 360. The power transmission line monitor 301 is in communication with the network 12. The power transmission line monitor 301 is in communication with a remote server 16. The remote server may be in communication with the cloud computing service 14 via the network 12.

Figure 13:
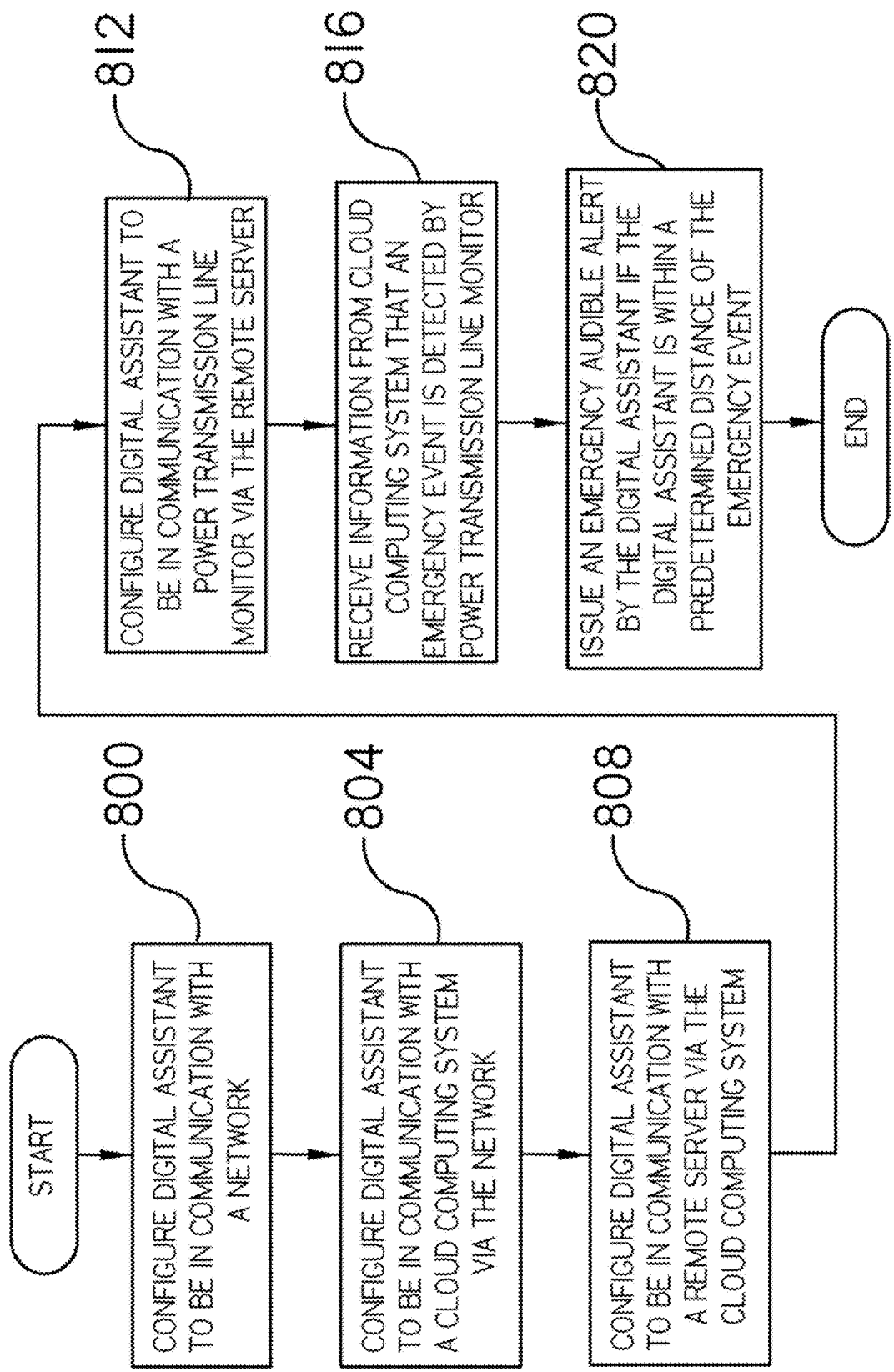
FIG. 13 is a flowchart showing one embodiment of a method performed by the digital assistant.

FIG. 13 is a flowchart illustrating a method that may be performed by the digital assistant. At act 800, the digital assistant is configured to be in communication with a network. At act 804, the digital assistant is configured to be in communication with a cloud computing system via the network. At act 808, the digital assistant is configured to be in communication with a remote server via the cloud computing system. At act 812, the digital assistant is configured to be in communication with a power transmission line monitor via the server. At act 816, the digital assistant receives information from the cloud computing system that an emergency event is detected by the power transmission line monitor. At act 820, the digital assistant issues an emergency audible alert if the digital assistant is within a predetermined distance of the emergency event.

FIG. 14 is a flowchart illustrating a method that may be performed by the power transmission line monitor. At act 824, the power transmission line monitor is configured to be in communication with a network. At act 828, the power transmission line monitor is configured to be in communication with a remote server via the network. At act 832, the power transmission line monitor is configured to be in communication with a cloud computing system via the remote server. At act 836, the power transmission line monitor is configured to be in communication with a digital assistant located in a residence or a business via the cloud computing system. At act 840, the power transmission line monitor monitors temperature, electric current in a power transmission line, and three-axis shock above a threshold level, and transmits the temperature, electric current, and three-axis shock information to the remote server. At act 844, the power transmission line monitor provides a visible warning to passersby via led lamps located on the power transmission line monitor. At act 848, the power transmission line monitor rapidly flashes a specific pattern of pulses via led lamps, located on the power transmission line monitor, that indicates the status of the power transmission line monitor and the conditions being monitored, wherein the pulses can be read with an optical receiver and which individual pulses cannot be perceived by the human eye.

Throughout this patent application, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed smart assistants, smart phones, tablets, or hand held computers are also deemed to comprise computing devices having a processor and a non-transitory memory storing instructions executable by the processor that cause the device to control, manage, or otherwise manipulate the features of the disclosed apparatuses, systems and methods.

REFERENCE NUMERALS

FIG. 1:
10 A commercially available home voice activated digital assistant such as an Amazon Alexa.
20 power source for the voice activated digital assistant.
FIG. 2:
50 A commercially available home voice activated digital assistant such as an Amazon Dot.
FIG. 3:
100 A road or street that connects to each homes driveway.
110 A residential home.
120 A plurality of trees.
FIG. 4:
100 A road or street that may connect to each home's driveway.
110 A residential home.
120 A plurality of trees.
130 A fire.
140 Smoke.
FIG. 5:
200 A road or street that may connect to each home's driveway.
210 A residential home.
220 A plurality of trees.
FIG. 6:
200 A road or street that may connect to each home's driveway.
210 A residential home.
220 A plurality of trees.
230 A wildfire.
240 A dashed line surrounding the homes that are in the most immediate danger from the wildfire.
250 A dashed line surrounding the homes that are in the less danger from the wildfire because they are further from the wildfire.
FIG. 7:
300 A clamshell housing.
301 A power transmission line monitor.
310 At least one latch that holds the clamshell type, clamp-on power line monitor closed and fixed to the power line.
320 At least one latch that holds the clamshell type, clamp-on power line monitor closed and fixed to the power line.

330 An LED used to indicate the status of the power line monitor.
340 An LED used to indicate the status of the power line monitor.
350 An LED used to indicate the status of the power line monitor.
360 A power line.
FIG. 8:
400 A power line.
410 A power line.
420 A power line.
430 A clamshell type, clamp-on power line monitor.
440 A clamshell type, clamp-on power line monitor.
450 A clamshell type, clamp-on power line monitor.
FIG. 9:
400 A power line.
410 A power line.
420 A power line.
430 A clamshell type, clamp-on power line monitor.
440 A clamshell type, clamp-on power line monitor.
450 A clamshell type, clamp-on power line monitor.
500 A utility pole used to support the power lines.
510 A road.
FIG. 10:
400 A power line.
410 A power line.
420 A power line.
430 A clamshell type, clamp-on power line monitor.
440 A clamshell type, clamp-on power line monitor.
450 A clamshell type, clamp-on power line monitor.
500 A utility pole used to support the power lines.
510 A road.
600 A wildfire.
FIG. 11:
700 A user who is near a voice activated digital assistant.
705 A cloud computing services for the voice activated digital assistant.
710 A cloud computing services for a power line monitor.
715 A communication link between different cloud computing services.
720 A communication link between a voice activated digital assistant and the AVS.
725 A communication link between a power line monitor and its cloud service.
730 A power line.
735 A power line monitor.
740 A voice activated digital assistant.
745 Audio produced by the voice activated digital assistant.
FIG. 12:
10 A digital assistant.
12 A network.
14 A cloud computing service.
16 A remote server.
301 A power transmission line monitor.
360 A power transmission line.
FIG. 13:
800 A flowchart block that represents a process that configures the digital assistant.
804 A flowchart block that represents a process that configures the digital assistant with a cloud computing system.
808 A flowchart block that represents a process that configures the digital assistant with a remote server.
812 A flowchart block that represents a process that configures the digital assistant with a power line monitor.
816 A flowchart block that represents reception of an emergency event from a power line monitor to the digital assistant.
820 A flowchart block that represents a process where the digital assistant produces an audible alert.
FIG. 14:
824 A flowchart block that represents a process that configures the digital assistant to communicate with a network.
828 A flowchart block that represents a process that configures the digital assistant with a remote server.
832 A flowchart block that represents a process that configures the digital assistant with a cloud computing system.
836 A flowchart block that represents a process that configures the power line monitor to be in communication with a digital assistant.
840 A flowchart block that represents a process that enables a power line monitor a plurality of power line conditions.
844 A flowchart block that represents a process where the power line monitor produces an audible and visual alert.
848 A flowchart block that represents a process where the power line monitor produces rapid pulses of light from the LEDs to indicate the status of the power line monitor.

The disclosed system for geolocation awareness for voice activated digital assistants system and apparatus has many advantages. The system allows utility companies to save time, money and resources by pinpointing where problem power transmission lines are. The system provides warnings to owners of voice activated digital assistants of emergency events, such as fires, earth quakes, explosions, damaged power lines, power outages, extreme wind warnings, ice warnings, etc.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A system for geolocation awareness for voice activated digital assistants comprising:
   a plurality of digital assistants in communication with a network;
   a cloud computing system in communication with the plurality of digital assistants via the network;
   a power transmission line monitor in communication with the network, the power transmission line monitor configured to monitor temperature, electric current in the power transmission line, and three-axis shock above a threshold level;

a remote server in communication with the power transmission line monitor via the network and in communication with the cloud computing system via the network, the remote server configured to determine if the monitored temperature indicates an emergency event, and configured to determine if the monitored electric current indicates an emergency event, and configured to determine if the monitored three-axis shock indicates an emergency event, the remote server further configured to transmit to the cloud computing system the type and location of an indicated emergency event; and wherein the cloud computing system is configured to instruct the digital assistants within a predetermined distance from the emergency event to audibly alert about the emergency event for a predetermined time period.

2. The system of claim 1, wherein the power transmission line further comprises:

a clamshell housing configured to attach to a power transmission line;

a plurality of led lamps located on the clamshell housing.

3. The system of claim 2, wherein the led lamps are configured to provide a visible warning to passersby about an emergency event.

4. The system of claim 2, wherein the led lamps are configured to rapidly flash a specific pattern of pulses that indicates the status of the power transmission line monitor and the conditions being monitored, wherein the pulses can be read with an optical receiver.

5. The system of claim 4, wherein the pulses are flashed so rapidly that the human eye cannot discern the pulses.

6. The system of claim 1, wherein the power transmission line further comprises:

a clamshell housing configured to attach to a power transmission line; and an acoustic alarm located on the clamshell housing.

7. The system of claim 1, wherein the remote server is in communication with an electric power provider and informs the electric power provider of the status of the power transmission line.

8. A digital assistant comprising a non-transitory computer-readable medium, wherein the medium includes a set of instructions stored thereon that when accessed by a processor enable the processor to perform a method of geolocation awareness for the digital assistant, the method comprising:

configuring the digital assistant to be in communication with a network;

configuring the digital assistant to be in communication with a cloud computing system via the network;

configuring the digital assistant to be in communication with a remote server via the cloud computing system;

configuring the digital assistant to be in communication with a power transmission line monitor via the remote server;

receiving information from the cloud computing system that an emergency event is detected by the power transmission line monitor;

issuing an emergency audible alert by the digital assistant if the digital assistant is within a predetermined distance of the emergency event.

9. A power transmission line monitor comprising a non-transitory computer-readable medium, wherein the medium includes a set of instructions stored thereon that when accessed by a processor enable the processor to perform a method of geolocation awareness for a digital assistant, the method comprising:

configuring the power transmission line monitor to be in communication with a network;

configuring the power transmission line monitor to be in communication with a remote server via the network;

configuring the power transmission line monitor to be in communication with a cloud computing system via the remote server;

configuring the power transmission line monitor to be in communication with a digital assistant located in a residence or a business via the cloud computing system;

monitoring temperature, electric current in a power transmission line, and three-axis shock above a threshold level, transmitting the temperature, electric current, and three-axis shock information to the remote server.

10. The power transmission line monitor of claim 9, where the method further comprises:

providing a visible warning to passersby via led lamps located on the power transmission line monitor.

11. The power transmission line monitor of claim 9, where the method further comprises:

rapidly flashing a specific pattern of pulses via led lamps, located on the power transmission line monitor, that indicates the status of the power transmission line monitor and the conditions being monitored, wherein the pulses can be read with an optical receiver and which pulses cannot be discerned by the human eye.

12. The power transmission line monitor of claim 9, where the method further comprises:

configuring the remote server to communicate to an electric power provider and informing the electric power provider of the status of the power transmission line.

* * * * *